(12) United States Patent
Ueno et al.

(10) Patent No.: US 8,620,566 B2
(45) Date of Patent: Dec. 31, 2013

(54) HYBRID VEHICLE ACCELERATOR PEDAL DEPRESSING FORCE CONTROL DEVICE

(75) Inventors: Munetoshi Ueno, Atsugi (JP);
Masahide Hashida, Hasuda (JP);
Daisuke Yoshinoya, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/699,174

(22) PCT Filed: Apr. 27, 2011

(86) PCT No.: PCT/JP2011/060305
§ 371 (c)(1),
(2), (4) Date: Nov. 20, 2012

(87) PCT Pub. No.: WO2011/148753
PCT Pub. Date: Dec. 1, 2011

(65) Prior Publication Data
US 2013/0066508 A1   Mar. 14, 2013

(30) Foreign Application Priority Data

May 25, 2010   (JP) ................................. 2010-118920

(51) Int. Cl.
G06G 7/62 (2006.01)
B60L 9/00 (2006.01)
B60K 6/20 (2007.10)

(52) U.S. Cl.
USPC ........................... 701/110; 701/22; 180/65.21

(58) Field of Classification Search
USPC ........... 701/22, 36, 70, 78, 79, 110; 180/65.1, 180/65.21; 903/904
See application file for complete search history.

(56) References Cited

U.S. PATENT DOCUMENTS

2005/0082992 A1* 4/2005 Aizawa et al. .................. 318/66

FOREIGN PATENT DOCUMENTS

| JP | 2005-132225 A | 5/2005 |
| JP | 2006-180626 A | 7/2006 |
| JP | 2007-182196 A | 7/2007 |
| JP | 2007-261399 A | 10/2007 |

\* cited by examiner

Primary Examiner — Mary Cheung
Assistant Examiner — Rodney Butler
(74) Attorney, Agent, or Firm — Foley & Lardner LLP

(57) ABSTRACT

An accelerator pedal depression force control apparatus for a hybrid vehicle is arranged to increase the depression force of the accelerator pedal than a base depression force when the accelerator opening degree becomes larger than an accelerator opening degree threshold value, and arranged to set a the first accelerator opening degree based on an accelerator opening degree which switches from a first running mode in which the vehicle runs by driving only the electric motor, to a second running mode in which the internal combustion engine is driven, to set a second accelerator opening degree based on the accelerator opening degree by which the vehicle can run at a constant speed at each vehicle speed, and to set the accelerator opening degree threshold value as a larger one of the first accelerator opening degree and the second accelerator opening degree.

6 Claims, 5 Drawing Sheets

- 1 — ENGINE
- 2 — MOTOR GENERATOR
- 3 — AUTOMATIC TRANSMISSION
- 4 — FIRST CLUTCH
- 5 — SECOND CLUTCH
- 6 — DIFFERENTIAL GEAR
- 7 — TIRE
- 8 — INVERTER
- 9 — BATTERY
- 10 — ENGINE SPEED SENSOR
- 11 — MG ROTATION SENSOR
- 12 — AT INPUT ROTATION SENSOR
- 13 — AT OUTPUT ROTATION SENSOR

15 --- VEHICLE SPEED SENSOR
16 --- SOC SENSOR
17 --- ACCELERATOR OPENING DEGREE SENSOR
18 --- COMMUNICATION LINE
20 --- INTEGRATED CONTROLLER
21 --- ENGINE CONTROLLER
22 --- MG CONTROLLER
23 --- BRAKE HYDRAULIC PRESSURE SENSOR (a)

(b)

HYBRID VEHICLE ACCELERATOR PEDAL DEPRESSING FORCE CONTROL DEVICE

TECHNICAL FIELD

This invention relates to an accelerator pedal depression force control apparatus for a hybrid vehicle.

BACKGROUND ART

A Patent Document 1 discloses a hybrid vehicle including a motor and an internal combustion engine which serve as a driving source of the vehicle. The Patent Document 1 discloses an art to vary a depression characteristic of an accelerator pedal at a shift from a first running mode in which the vehicle runs only by the motor to a second running mode in which the vehicle runs by concurrently using the motor and the internal combustion engine, and thereby to increase a resistance force to the depression of the accelerator pedal so as to prevent the deterioration of the fuel economy due to the start of the internal combustion engine by a shift of the running mode against the driver's intension.

In this Patent Document 1, it is possible to set to vary an accelerator opening degree which increase the resistance force to the depression of the accelerator pedal. However, the accelerator pedal is hard to be depressed when the accelerator opening degree to increase the resistance force to the depression of the accelerator pedal becomes small. Accordingly, there is a problem that the vehicle is hard to be accelerated.

PRIOR ART DOCUMENT

Patent Document

Patent Document 1: Japanese Patent Application Publication No. 2006-180626

SUMMARY OF THE INVENTION

Therefore, in the present invention, in an accelerator pedal depression force control apparatus for a hybrid vehicle being configured to increase a depression force of an accelerator pedal than a base depression force when an accelerator opening degree becomes larger than a predetermined accelerator opening degree threshold value, the predetermined accelerator pedal opening degree threshold value is a first accelerator opening degree set based on a mode switching accelerator opening degree which switches from a first running mode in which the vehicle runs by driving only the electric motor to a second running mode in which the internal combustion engine is driven, and a predetermined lower limit value is set to this first accelerator opening degree.

According to the present invention, it is possible to depress the accelerator pedal by the constant amount or more by providing the first accelerator opening degree to the lower limit value. Consequently, it is possible to ensure the acceleration of the vehicle.

BRIEF DESCRIPTION OF DRAWINGS

FIG. 7(a) shows an example of the characteristic when the SOC of the battery is high.

DESCRIPTION OF EMBODIMENTS

Hereinafter, one embodiment of the present invention will be illustrated in detail with reference to the drawings.

Figure 1:
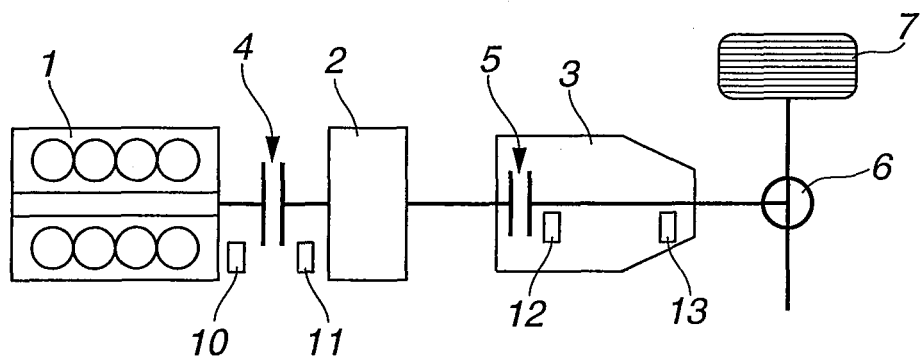
FIG. 1 is an explanatory view schematically showing a schematic configuration of a power train system of a hybrid vehicle to which the present invention is applied.

FIG. 1 is an explanatory view schematically showing a schematic configuration of a power train of a hybrid vehicle to which the present invention is applied.

An output shaft of an engine 1 which is an internal combustion engine, and an input shaft of a motor generator 2 (MG) which is an electric motor serving as a generator are connected through a first clutch 4 (CL1) arranged to vary its torque capacity. An output shaft of the motor generator 2 is connected to an input shaft of an automatic transmission 3 (AT). An output shaft of the automatic transmission 3 is connected through a differential gear 6 to tires 7.

For example, the automatic transmission 3 is configured to automatically switch stepwise transmission gear ratios such as forward five speeds and one reverse speed, forward six speeds and one reverse speed, and so on (to perform a shift control), in accordance with a vehicle speed, an accelerator opening degree and so on.

One of clutches which can vary the torque capacity, and which serve as different power transmissions within the automatic transmission 3 in accordance with the shift state is used as a second clutch 5 (CL2). That is, the second clutch 5 is one of a plurality of frictional engagement elements provided as shift elements of the automatic transmission 3. The second clutch 5 uses (diverts) the frictional engagement element existing in a power transmitting path at each gear stage (shift stage), and which is substantially provided within the automatic transmission 3.

The automatic transmission 3 combines a power of the engine 1 which is inputted through a first clutch 4, and a power which is inputted from the motor generator 2, and outputs this combined power to the tires 7. For example, wet-type multiple plate clutches which are capable of continuously controlling flow rate and hydraulic pressure of the hydraulic fluid by proportional solenoids are used in the first clutch 4 and the second clutch 5.

In this power train system, there are two driving modes according to a connection state of the first clutch 4. That is, in a disconnection state of the first clutch 4, the vehicle becomes an EV mode in which the vehicle runs only by the power of the motor generator 2. In a connection state of the first clutch 4, the vehicle becomes an HEV mode in which the vehicle runs by the powers of the engine 1 and the motor generator 2.

In FIG. 1, a numeral 10 is an engine speed sensor arranged to sense the engine speed of the engine 1. A numeral 11 is an MG rotation sensor arranged to sense the rotational speed of the motor generator 2. A numeral 12 is an AT input rotation sensor arranged to sense a rotational speed of the input shaft of the automatic transmission 3. A numeral 13 is an AT output rotation sensor arranged to sense a rotational speed of the output shaft of the automatic transmission 2. Detection signals of these sensors are inputted to an integrated controller 20 described below.

Figure 2:
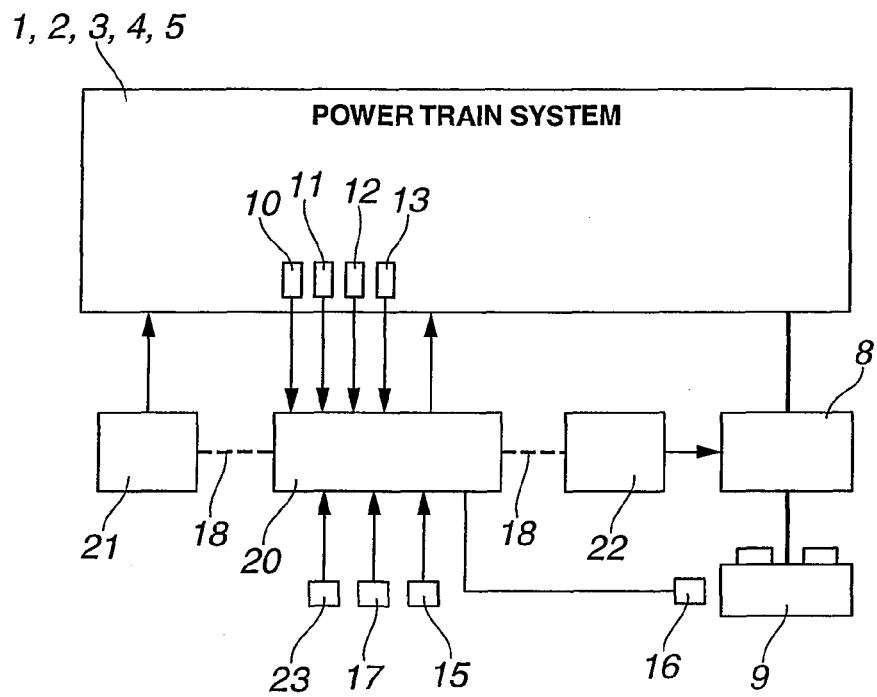
FIG. 2 is a system configuration view of the hybrid vehicle to which the present invention is applied.

FIG. 2 is a system configuration view of the hybrid vehicle to which the present invention is applied. This hybrid vehicle includes the integrated controller 20 configured to perform an integrated control of the vehicle, an engine controller 21 configured to control the engine 1, and an MG controller 22 configured to control the motor generator 2.

Integrated controller 20 is connected to the engine controller 21 and the MG controller 22 through communication lines 18 by which information is exchangeable with each other.

This integrated controller 20 receives the detection signals from the above-described engine speed sensor 10, the MG rotation sensor 11, the AT input rotation sensor 12, and the AT output rotation sensor 13, and also detection signals from various sensors such as a vehicle speed sensor 15 arranged to sense the vehicle speed, an SOC sensor 16 arranged to sense a state of charge (SOC) of a battery 9 arranged to supply the power to the motor generator 2, an accelerator opening degree sensor 17 arranged to sense the accelerator opening degree (APO), and a brake hydraulic pressure sensor 23 arranged to sense a brake hydraulic pressure.

Integrated controller 20 outputs a target MG torque or a target MG rotational speed to the MG controller 22, and outputs a target engine torque to the engine controller 21. The first clutch 4 and the second clutch 5 are controlled to be engaged and disengaged based on the command from the integrated controller 20.

Moreover, the integrated controller 20 calculates the driving mode of the engine 1 by using the vehicle speed and the accelerator opening degree. That is, it is judged whether it is in a driving state where the engine is to be started, or in a driving state where the engine is to be stopped, by using an engine start stop line map shown in FIG. 3. An engine start line and an engine stop line are varied in a direction (in a downward direction in FIG. 3) to decrease the accelerator opening degree as the SOC of the battery 9 is lowered. Furthermore, in case of the same state of the SOC of the battery 9, the engine stop line is set in a direction to decrease the accelerator opening degree, relative to the engine start line. That is, in case of the same state of the SOC of the battery 9 and the same vehicle speed, the accelerator opening degree for stopping the engine 1 (the accelerator opening degree on the engine stop line) is set to be smaller than the accelerator opening degree for starting the engine 1 (the accelerator opening degree on the engine start line).

Figure 3:
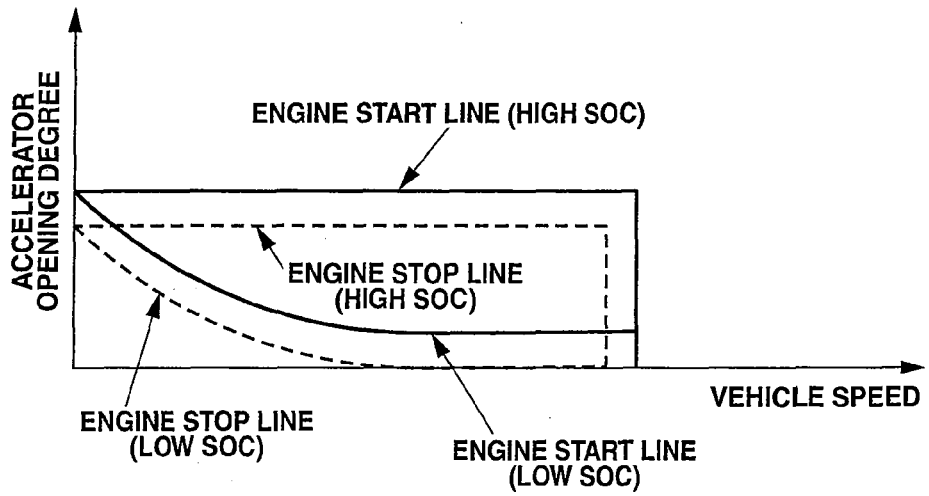
FIG. 3 is an explanatory view showing an example of a characteristic of an engine start stop line map.

In the start operation to start the engine 1, the torque capacity of the second clutch 5 is controlled so that the second clutch 5 is slipped to the half clutch state at a timing when the accelerator opening degree exceeds the engine start line shown in FIG. 3 in the EV running state. After it is judged that the second clutch 5 is started to be slipped, the engagement of the first clutch 4 is started, and the engine speed is increased. Then, when the engine speed reaches the rotational speed by which an initial ignition can be attained, the engine 1 is actuated. When the MG rotational speed and the engine speed are closer to each other, the first clutch 4 is fully engaged. Then, the second clutch 5 is lockuped so that it is transited to the HEV mode.

The engine controller 21 controls the engine 1 in accordance with the command from the integrated controller 20.

The MG controller 22 controls an inverter 8 arranged to drive the motor generator 2, in accordance with the command from the integrated controller 20. In the motor generator 2, a power running operation in which the electric power supplied from the battery 9 is applied, a regenerative operation in which the motor generator 9 serves as the generator to charge the battery 9, and the switching between the start and the stop are controlled by the MG controller 22. The output (the current value) of the motor generator 2 is monitored by the MG controller 22.

Figure 4:
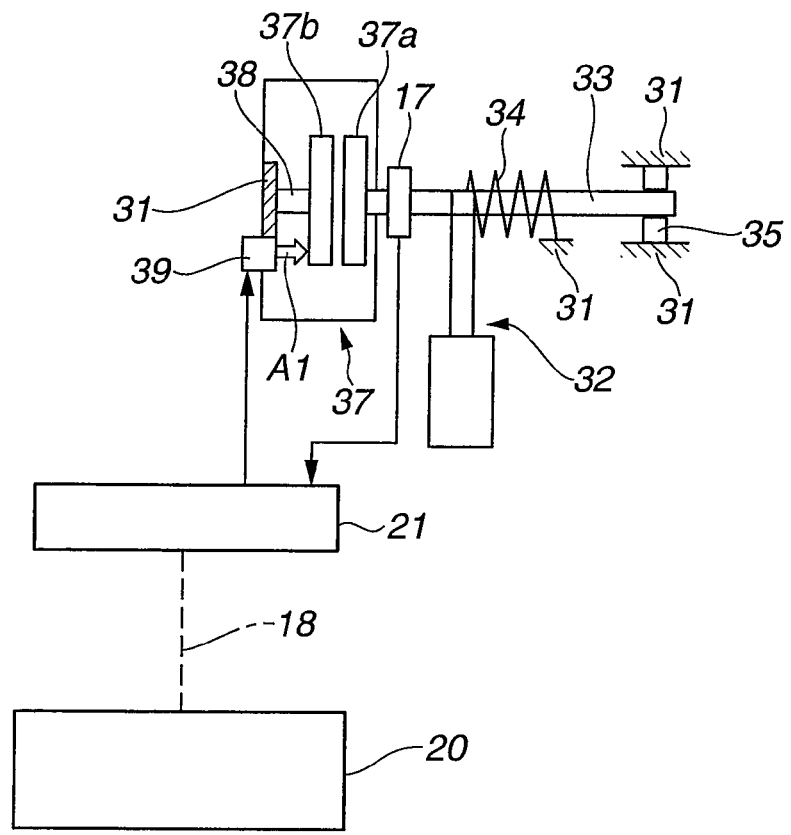
FIG. 4 is an explanatory view schematically showing a system configuration of an accelerator pedal depression force control apparatus according to the present invention and also a schematic configuration of a depression force varying mechanism.
Figure 5:
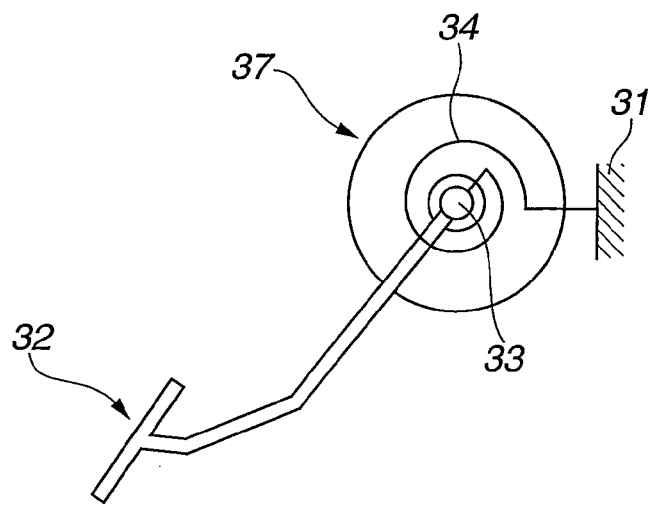
FIG. 5 is an explanatory view schematically showing one embodiment of the depression force varying mechanism in the present invention.

Next, the accelerator pedal depression force control apparatus applied to the above-described hybrid vehicle is illustrated by using FIG. 4 and FIG. 5.

FIG. 4 is an explanatory view schematically showing a system configuration of an accelerator pedal depression force control apparatus and also a schematic configuration of a depression force varying mechanism. FIG. 5 is an explanatory view schematically showing one embodiment of the depression force varying mechanism.

Basically, this accelerator pedal depression force control apparatus is arranged to variably control the depression force (the operation reaction force) of an accelerator pedal 32 provided to a vehicle body 31 of the vehicle (not shown), and to increase the depression force of the accelerator pedal 32 than a base depression force in a region in which the opening degree of the accelerator pedal 32 is greater than a predetermined accelerator opening degree threshold value.

As shown in FIGS. 4 and 5, the accelerator pedal 32 is provided on a rotation shaft 33. The accelerator pedal 32 is arranged to be swung about the rotation shaft 33. The accelerator pedal 32 receives a reaction force in an accelerator closing direction by a return spring 34 which may have various shapes, and which has one end fixed to the vehicle body 31, and the other end fixed to the rotation shaft 33. Moreover, one end of the rotation shaft 33 is rotatably supported by the vehicle body 31 through a bearing 35. On the other hand, the above-described accelerator opening degree sensor 17 serving as an accelerator opening degree sensing section is provided near the other end of the rotation shaft 33.

In this embodiment, a depression amount of the accelerator pedal 32 (the accelerator opening degree) and an opening degree of a throttle valve (not shown) of the engine 1 are coordinated with each other. The opening degree of the throttle valve of the engine 1 is increased in accordance with the depression amount of the accelerator pedal 32. That is, a fuel injection amount (and then a fuel consumption amount) is increased in accordance with the accelerator opening degree.

The depression force varying mechanism is constituted by a variable friction plate 37 including a pair of friction members 37a and 37b which confront each other, and which are arranged to provide the frictional force to the rotation of the rotation shaft 33. One friction member 7a is mechanically connected to an end portion of the rotation shaft 3. The other friction member 7b is supported through splines and so on to a fix shaft 38 so as to be moved in an axial direction, and so as not to be rotated. The fix shaft 38 is fixed to and supported by the vehicle body 31. Moreover, an actuator (for example, electromagnetic solenoid) 39 arranged to urge the friction member 37b toward the friction member 37a is fixed to the vehicle body 31.

The variable friction plate 37 moves the friction member 37b in the axial direction (in a direction of an arrow A1 in FIG. 4) by the actuation of the actuator 39. With this, the variable friction plate 37 variably controls the friction force between the friction member 37a and the friction member 37b. This actuation of the actuator 39 is controlled by the engine controller 21 based on the command from the integrated controller 20. Accordingly, it is possible to vary the friction force applied to the rotation shaft 33, and then the depression force at the depression of the accelerator pedal 32, by controlling the actuation of the actuator 39 by the engine controller 21.

Figure 6:
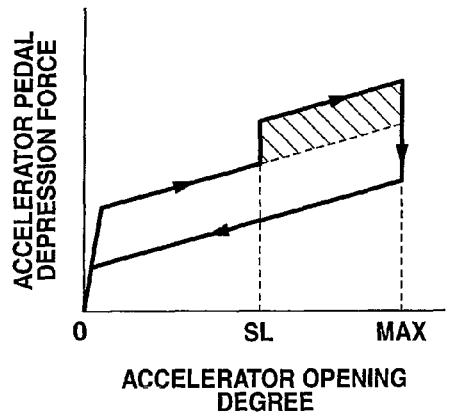
FIG. 6 is a characteristic view showing a characteristic of the accelerator pedal depression force in the present invention.

FIG. 6 schematically shows a characteristic of the accelerator pedal depression force in the above-described embodiment. A basic depression force, that is, a base depression force has an appropriate hysteresis in the opening degree increasing direction and in the opening degree decreasing direction, and is increased to be substantially proportional to the accelerator opening degree. When the accelerator opening degree becomes greater than a predetermined accelerator opening degree threshold value (a symbol SL in FIG. 6) at the operation in the opening degree increasing direction, that is, at the depression, the accelerator pedal depression force is increased than the base depression force in a stepped manner. Accordingly, the further depression of the accelerator pedal 32 by the driver is naturally suppressed by increasing the accelerator pedal depression force in the stepped manner.

In this embodiment, the increase of the depression of the accelerator pedal 32 in the above-described accelerator opening degree increasing direction is canceled when the accelerator opening degree becomes equal to or smaller than the above-described predetermined opening degree. However, it may be immediately canceled when the operation direction of the accelerator pedal 32 is turned over (reversed) in the accelerator opening degree decreasing direction.

In this embodiment, the accelerator opening degree threshold value at which the depression force of the accelerator pedal 32 is increased than the base depression force is set by a first accelerator opening degree set based on the accelerator opening degree corresponding to the engine start line shown in FIG. 3, and a second accelerator opening degree based on the accelerator opening which is a flat road constant speed balancing (equilibrium) opening degree, that is, the second accelerator opening degree set by the accelerator opening degree on an R/L line (road load line) necessary for running the vehicle on the flat road without the acceleration and the deceleration.

Figure 7:
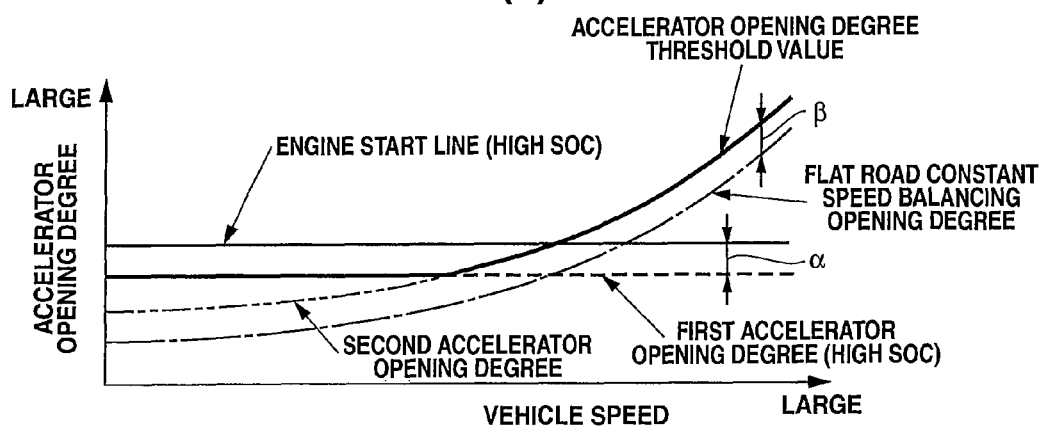
FIGS. 7(a) and (b) show explanatory views showing an example of a characteristic of an accelerator pedal opening degree threshold value.
FIG. 7(b) shows an example of the characteristic when the SOC of the battery is low.
Figure 7:
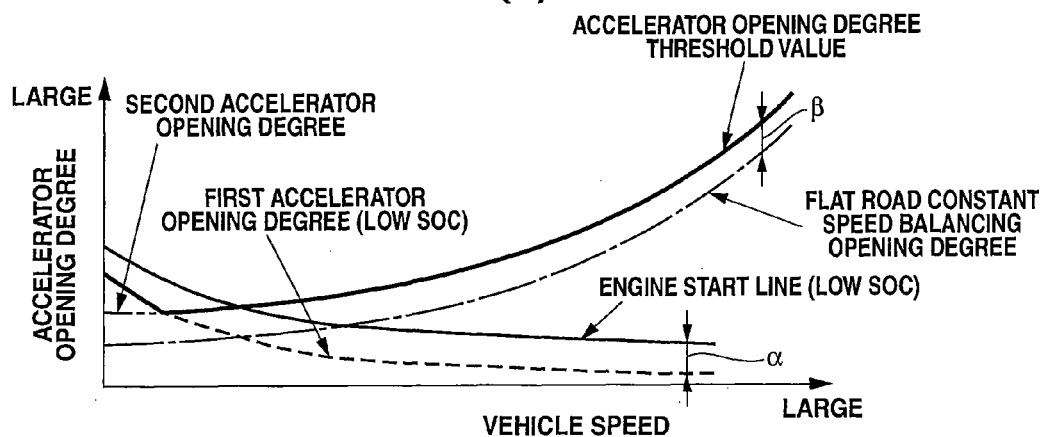

FIG. 7 are illustrative views showing an example of a characteristic of an accelerator pedal opening degree threshold value. FIG. 7(a) shows an example of the characteristic when the SOC of the battery is high. FIG. 7(b) shows an example of the characteristic when the SOC of the battery is low.

The first accelerator opening degree (broken lined in FIG. 7) is an accelerator opening degree obtained by subtracting a predetermined accelerator opening degree α from the accelerator opening on the engine start line (solid lined in FIG. 7) which is a threshold value at which the vehicle is switched from the EV running to the HEV running. This accelerator opening degree α is set in consideration of the opening degree that the driver depresses until the depression of the accelerator pedal 32 is stopped by feeling the pedal reaction force. The second accelerator opening degree (two-dot chain line in FIG. 7) is an accelerator opening degree obtained by adding an accelerator opening degree β which can ensure a driving force by which the vehicle can be accelerated with the constant acceleration, to the accelerator opening degree (which is an accelerator opening degree on the R/L line, and which is chain lines in FIG. 7) by which the vehicle can run at the constant speed on the flat road at each vehicle speed.

As illustrated in detail by using FIG. 7, the engine start line is varied in a direction (in the downward direction in FIG. 7) in which the accelerator opening degree is decreased when the SOC of the battery 9 is decreased. Accordingly, the first accelerator opening degree is also decreased when the SOC of the battery 9 is decreased. In a case where the accelerator opening degree threshold value is set only by the first accelerator opening degree, the accelerator opening degree threshold value is relatively decreased as the SOC of the battery 9 is decreased. Accordingly, the driver may be hard to depress the accelerator pedal 32 in a case where the driver wants to depress the accelerator pedal 32. However, in this embodiment, when the first accelerator opening degree becomes smaller than the second accelerator opening degree, the accelerator opening degree threshold value is switched to the second accelerator opening degree. That is, in this embodiment, the accelerator opening degree threshold value (bold lines in FIG. 7) is set as a larger one of the first accelerator opening degree and the second accelerator opening degree at each vehicle speed. That is, the accelerator opening degree threshold value is basically set as the first accelerator opening degree. The first accelerator opening degree has a lower limit value defined by the second accelerator opening degree.

In this way, the first accelerator opening degree is set based on the engine start line. The lower limit value defined by the second accelerator opening degree is further set with respect to the thus-set first accelerator opening degree. With this, it is possible to prevent that the driver is hard to depress the accelerator pedal 32 when the driver want to depress the accelerator pedal 32. Moreover, it is possible to depress the accelerator pedal 32 by the constant amount or more, and thereby to ensure the good acceleration of the vehicle.

In particular, the second accelerator opening degree which is the lower limit value of the first accelerator opening degree is the accelerator opening degree that is obtained by adding the accelerator opening amount β which can ensure the driving force by which the vehicle can be accelerated with the constant acceleration, to the flat road constant speed balancing opening degree by which the vehicle can run at the constant speed at each vehicle speed. Accordingly, it is possible to surely ensure the driving force necessary for the acceleration at each vehicle speed.

Furthermore, the accelerator opening degree which is the flat road constant speed balancing opening degree is increased as the vehicle speed is increased. Accordingly, the second accelerator opening degree is also increased as the vehicle speed is increased. When the vehicle speed is increased, the transmission gear ratio is decreased. Consequently, the vehicle driving force is decreased. Then, the vehicle driving force is decreased, and the acceleration more than necessary is less likely to be generated. In this way, the second accelerator opening degree which is the lower limit value of the first accelerator opening degree is increased as the vehicle speed is increased. With this, it is possible to ensure the acceleration of the vehicle even at the high vehicle speed.

Moreover, when the SOC of the battery 9 is decreased, the maximum torque which can be generated by the motor generator 2 is decreased. Accordingly, it is necessary to decrease the driving region of the EV mode. However, the first accelerator opening degree is decreased as the SOC of the battery 9 is decreased since the first accelerator opening degree is set based on the engine start line. That is, the first accelerator opening degree is varied in accordance with the SOC of the battery 9. Accordingly, in a driving state where the first accelerator opening degree is selected as the accelerator opening degree threshold value and the second accelerator opening degree is not selected, the depression force of the accelerator pedal 32 is increased than the base depression force just before the switching from the EV mode to the HEV mode.

With this, it is possible to inform the driver of the switching from the EV mode to the HEV mode.

That is, as shown in FIG. 7, in a state where the first accelerator opening degree is larger than the second accelerator opening degree and the vehicle speed is low, the first accelerator opening degree is selected as the accelerator opening degree threshold value. With this, the depression force of the accelerator pedal 32 is increased than the base depression force just before the switching from the EV mode to the HEV mode. Accordingly, it is possible to inform the driver of the switching from the EV mode to the HEV mode.

Figure 8:
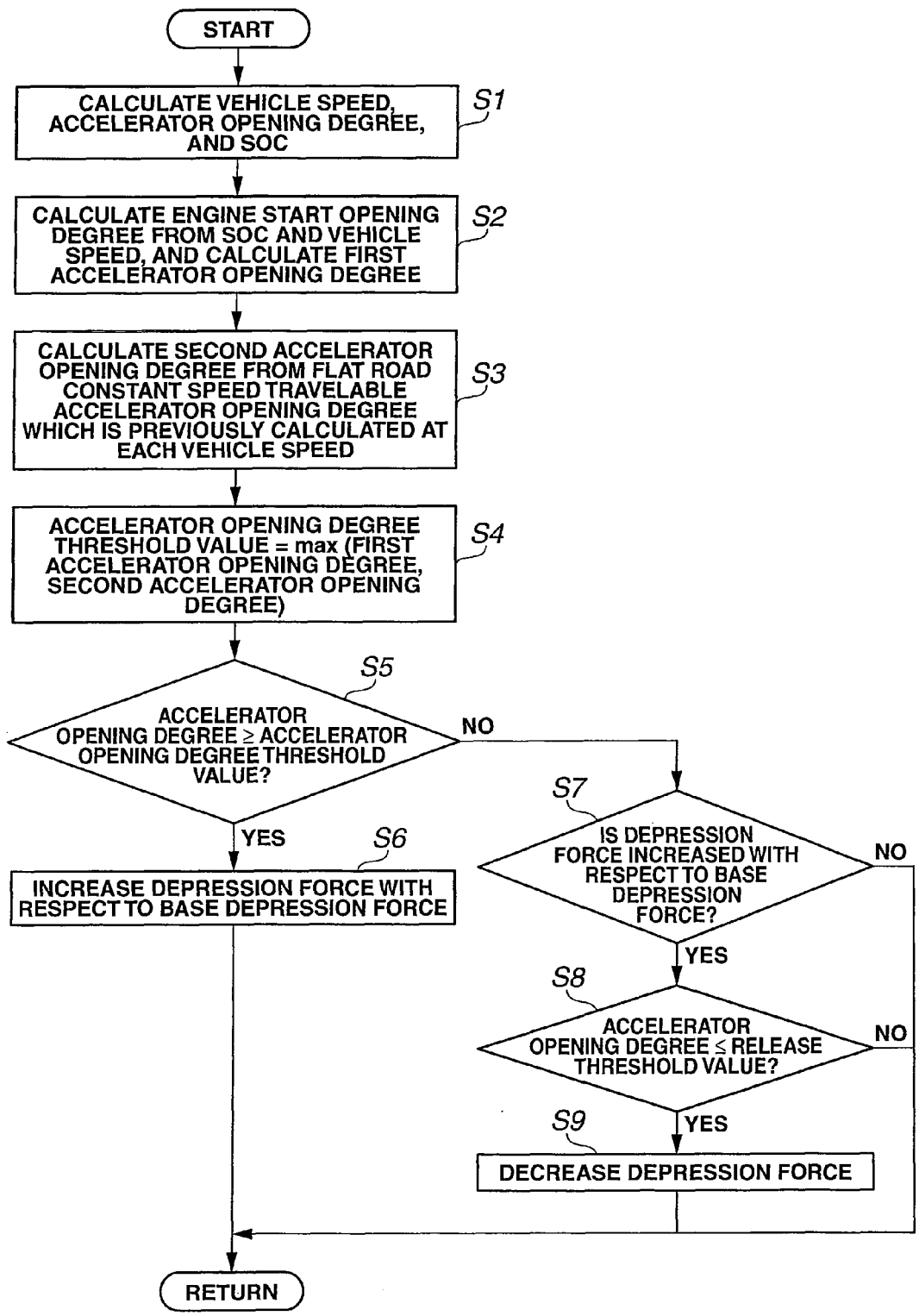
FIG. 8 is a flowchart showing a flow of a control of the accelerator pedal depression force control apparatus for the hybrid vehicle according to the present invention.

FIG. 8 shows a flowchart showing a flow of the control when the depression force of the accelerator pedal 32 is increased than the base depression force.

At S1, the vehicle speed, the accelerator opening degree, and the SOC of the battery 9 are calculated.

At S2, the engine start line is calculated from the SOC of the battery 9 and the vehicle speed, and the first accelerator opening degree is calculated from the engine start line.

At S3, the second accelerator opening degree is calculated from the accelerator opening degree which is previously calculated at each vehicle speed, and by which the vehicle can run at the constant speed on the flat road.

At S4, the larger one of the first accelerator opening degree and the second accelerator opening degree is set to the accelerator opening degree threshold value. At S5, it is judged whether or not the accelerator opening degree is equal to or greater than the accelerator opening degree threshold value. When the accelerator opening degree is equal to or greater than the accelerator opening degree threshold value, the process proceeds to S6. When the accelerator opening degree is not equal to or greater than the accelerator opening degree threshold value, the process proceeds to S7.

At S6, the depression force of the accelerator pedal 32 is increased than the base depression force.

At S7, it is judged whether or not the depression force is increased than the base depression force. When the depression force is increased than the base depression force, the process proceeds to S8. When the depression force is increased, this routine is finished.

At S8, it is judged whether or not the accelerator opening degree is equal to or smaller than a predetermined cancel threshold value smaller than the accelerator opening degree threshold value. When the accelerator opening degree is equal to or smaller than the cancel threshold value, the process proceeds to S9. When the accelerator opening degree is not equal to or smaller than the cancel threshold value, this routine is finished.

At S9, the increase amount of the depression force is decreased since the depression force of the accelerator pedal 32 is increased than the base depression force irrespective of the return state of the accelerator pedal 32.

Besides, in the above-described embodiment, the first accelerator opening degree is a value obtained by subtracting the predetermined accelerator opening amount α from the accelerator opening degree on the engine start line. However, it is possible to set the accelerator opening degree on the engine start line, directly to the first accelerator opening degree. That is, it is possible to set the engine start line to the first accelerator opening degree.

The hybrid vehicle in the above-described embodiment has a structure in which the driving forces of the engine 1 and the motor generator 2 are transmitted to the wheels. However, the present invention is not applied only to the thus-constructed hybrid vehicle. For example, the present invention is applicable to various hybrid vehicles such as a hybrid vehicle having a structure in which the engine is used only for the power generation, and a hybrid vehicle having a structure in which the power from the engine is divided into the generator and the motor by a power dividing mechanism.

Moreover, in the above-described embodiment, the automatic transmission 3 is used as the transmission. However, it is possible to use a continuously variable transmission in which the transmission gear ratio is continuously varied, in place of the automatic transmission 3. In case of the continuously variable transmission, it is possible to calculate the transmission gear ratio as a ratio between the rotational speeds of the input shaft side and the output shaft side.

Moreover, in the above-described embodiment, the engine start line and the engine stop line are varied in accordance with the SOC of the battery 9. However, the engine start line and the engine stop line may be varied in accordance with a temperature of the battery 9, a deterioration state of the battery 9, the driving modes such as the sports running mode, and so on.

The invention claimed is:

1. An accelerator pedal depression force control apparatus for a hybrid vehicle including an internal combustion engine, an electric motor which is used as a driving source when the vehicle runs, said apparatus comprising:
   a depression force varying section configured to vary a depression force of an accelerator pedal,
   wherein said accelerator pedal depression force control apparatus comprises a controller configured:
      to set the depression force to be applied by the accelerator pedal to be larger than a base depression force when an accelerator opening degree becomes larger than an accelerator opening degree threshold value,
      to set a first accelerator opening degree based on an accelerator opening degree which switches from a first running mode in which the vehicle runs by driving only the electric motor, to a second running mode in which the internal combustion engine is driven,
      to set a second accelerator opening degree based on the accelerator opening degree by which the vehicle can run at a constant speed at each vehicle speed, and
      to set the accelerator opening degree threshold value as a larger one of the first accelerator opening degree and the second accelerator opening degree.

2. The accelerator pedal depression force control apparatus for the hybrid vehicle as claimed in claim 1, wherein the second accelerator opening degree is set to be increased as the vehicle speed is increased.

3. The accelerator pedal depression force control apparatus for the hybrid vehicle as claimed in claim 1, wherein the first accelerator opening degree is set to be varied in accordance with a state (SOC) of a battery which is a driving source of the electric motor.

4. The accelerator pedal depression force control apparatus for the hybrid vehicle as claimed in claim 3, wherein the first accelerator opening degree is set to be decreased as the SOC of the battery is decreased.

5. The accelerator pedal depression force control apparatus for the hybrid vehicle as claimed in claim 1, wherein the first accelerator opening degree is set by subtracting a predetermined accelerator opening amount from the accelerator opening degree on an engine start line at which the hybrid vehicle is switched from the first running mode to the second running mode.

6. The accelerator pedal depression force control apparatus for the hybrid vehicle as claimed in claim 1, wherein the second accelerator opening degree is set by an accelerator opening degree obtained by adding an accelerator opening amount which can ensure a driving force by which the vehicle can be accelerated with a constant acceleration, to the accelerator opening degree by which the vehicle can run at the constant speed on a flat road at each vehicle speed.

* * * * *